(12) United States Patent
Monereau et al.

(10) Patent No.: US 6,517,609 B1
(45) Date of Patent: Feb. 11, 2003

(54) INSTALLATION FOR THE CYCLIC TREATMENT OF FLUID BY ADSORPTION WITH VALVES WITH IMPROVED SEALING

(75) Inventors: Christian Monereau, Paris (FR); Jean-Marc Belot, St. Maur (FR)

(73) Assignee: L'Air Liquide Societe Anonyme A Directoire et Conseil de Surveillance pour l'Etude et l'Exploitation, des Procedes Georges Claude, Paris (FR)

( * ) Notice: Subject to any disclaimer, the term of this patent is extended or adjusted under 35 U.S.C. 154(b) by 54 days.

(21) Appl. No.: 09/695,855

(22) Filed: Oct. 26, 2000

(30) Foreign Application Priority Data

Oct. 28, 1999 (FR) .............................. 99 13517

(51) Int. Cl.$^7$ .......................................... B01D 53/047
(52) U.S. Cl. ............... 95/96; 95/102; 95/130; 96/108; 96/130; 137/240
(58) Field of Search ............... 95/96–98, 100–106, 95/130, 138; 96/108, 130, 143, 144; 137/240; 251/214

(56) References Cited

U.S. PATENT DOCUMENTS

| 334,431 | A | * | 1/1886 | Harvey ..................... 137/240 |
| 3,043,324 | A | * | 7/1962 | Morgan ..................... 137/240 |
| 3,474,816 | A | * | 10/1969 | Burgess ..................... 137/240 |
| 4,253,483 | A | * | 3/1981 | Cornelius ..................... 137/240 |
| 5,037,065 | A | * | 8/1991 | Hirz et al. ..................... 251/214 |
| 5,223,004 | A | | 6/1993 | Eteve et al. ..................... 55/26 |
| 6,089,255 | A | * | 7/2000 | Bonnefous et al. ..... 137/240 X |
| 6,224,651 | B1 | * | 5/2001 | Monereau et al. .......... 95/96 X |
| 6,314,986 | B1 | * | 11/2001 | Zheng et al. ................ 137/240 |

FOREIGN PATENT DOCUMENTS

FR  2 455 233  11/1980

* cited by examiner

Primary Examiner—Robert H. Spitzer
(74) Attorney, Agent, or Firm—Young & Thompson

(57) ABSTRACT

The gas treatment installation operating on a treatment cycle, in which part of the cycle is performed at a pressure below atmospheric pressure, particularly a PSA, TSA or VSA installation, includes one or more gas treatment vessels containing adsorbent. Each vessel has at least one orifice, at least one gas pipe communicating with the orifice, at least one valve arranged on the gas pipe and controlling the flow of the gas flowing through the pipe. The valve comprises a shaft for operating the valve and sealing elements. A device for maintaining a protective gaseous atmosphere is arranged around the sealing elements and the operating shaft to create and to maintain a protective gaseous atmosphere around these items and thus prevent the ingress, into the treatment vessel, of contaminants harmful to the adsorbent, particularly the ingress of moisture liable to deactivate the molecular sieve, that is to say the adsorbent.

18 Claims, 4 Drawing Sheets

INSTALLATION FOR THE CYCLIC TREATMENT OF FLUID BY ADSORPTION WITH VALVES WITH IMPROVED SEALING

FIELD OF THE INVENTION

The invention relates to an installation and to a method for the cyclic treatment of fluid by adsorption using, during part of the fluid treatment cycle, a pressure below atmospheric pressure, particularly a method of the VSA type for separating and/or purifying a gaseous stream essentially containing oxygen and nitrogen, such as air.

BACKGROUND OF THE INVENTION

It is known that gases and gaseous mixtures find many applications on an industrial plane. Thus, the gases in the air, such as oxygen and nitrogen in particular, are commonly used in various fields, such as, in particular, the field of electronics, the field of combustion, the field of medicine, the field of foodstuffs, the field of welding, etc.

At the present time, one of the techniques used for producing or purifying gases, particularly the gases in the air, is the so-called PSA (Pressure Swing Adsorption) technique, that is to say adsorption using variations in pressure.

According to this PSA technique, when the gaseous mixture that is to be separated is, for example, air and the component that is to be recovered is oxygen, for example, the oxygen is separated from the gaseous mixture that the ambient air constitutes using preferential adsorption of at least the nitrogen onto one or more materials which has a preference to adsorb at least the nitrogen and which are subjected to given pressure cycles in one or more separation zones, generally one or more adsorbers.

The oxygen which is adsorbed little or not at all is recovered at the outlet of the separation zone or zones with a purity generally higher than 90%.

In other words, the adsorption technique is commonly employed to separate the various constituents of a gaseous mixture, so as to produce directly, in the case of air, relatively pure oxygen and/or nitrogen or, as the case may be, to eliminate from it certain impurities, for example water vapour, carbon dioxide, oxides of nitrogen, any traces of hydrocarbons, etc, whose presence may detract from the correct operation of the items of equipment located downstream, such as air fractionation units operating cryogenically, for example.

More generally, a PSA method for separating a gaseous mixture comprising a first component which is preferentially adsorbed onto an adsorbent material and a second component which is adsorbed onto the adsorbent material less preferentially than the first component, with a view to producing the second component, comprises, cyclically;

a stage of preferential adsorption of at least the first component onto the adsorbent material, at an adsorption pressure known as the "high pressure", accompanied by the recovery of at least some of the second component thus produced;

a stage of desorbing the first component thus trapped by the adsorbent, at a desorption pressure which is lower than the adsorption pressure and known as the "low pressure";

a stage of recompressing the separation zone containing the adsorbent by swinging from the low pressure to the high pressure.

In other words, in industrial installations based on the adsorption technique, a gaseous stream that it is to be treated flows through one or more adsorbent beds. After a certain running time, the adsorbent materials are saturated and are therefore no longer able to fix further molecules of gas.

It is then necessary to regenerate the adsorbent bed or beds. To do this, there are a number of regeneration or desorption techniques that can be used, for example an increase in temperature, a lowering in pressure, elution using a sweeping gas, etc, it being possible for these various techniques to be used jointly or in succession, if necessary.

At the present time, numerous methods employ a regeneration pressure below atmospheric pressure, that is to say below 1 bar ($10^5$ PA). A technique such as this which constitutes a special case of the PSA method is commonly known as the VPSA (Vacuum Pressure Swing Adsorption) method or technique, or more simply known as a VSA (Vacuum Swing Adsorption) method, that is to say adsorption with a variation in pressure under vacuum.

By way of example, mention may be made of:

document U.S. Pat. No. 5,042,994 which describes a method of separating the gases of the air comprising a desorption pressure below atmospheric pressure intended for the joint production of high-purity nitrogen and medium-purity oxygen, document U.S. Pat. No. 5,156,657 which relates to a PSA method for removing the water and $CO_2$ which are present in the stream of air, with use of a vacuum purge stage, document U.S. Pat. No. 5,395,427 relating to a PSA method with two adsorption stages for the production of high-purity oxygen with the two adsorption stages placed under vacuum during a production cycle, document U.S. Pat. No. 5,463,869 which attains to an incorporated adsorption/cryogenic distillation method for separating air, using a cycle of the VSA type during the separation, and document U.S. Pat. No. 5,785,740 which relates to a transatmospheric production cycle, particularly for the production of oxygen.

It would therefore seem, as shown by these documents, that the use, in a PSA method, of stages which are placed under vacuum, that is to say at a pressure below atmospheric pressure, so as to obtain a VSA method, is known and conventional.

At the present time, materials of the zeolite type are the adsorbents most often used in installations for the separation or purification of gas using a method of the PSA or VSA type. Such zeolites are described, in particular, in documents EP-A-486384, EP-A-606848, EP-A-589391, EP-A-589406, EP-A-548755, EP-A-109063, EP-A-827771 and EP-A-760248.

However, these adsorbents, particularly zeolites, are highly sensitive to contaminants of any nature likely to contaminate and deactivate them, particularly the contaminants present in atmospheric air.

It is thus known that, in air treatment units, traces of water considerably reduce the performance of the zeolites used either for stopping the $CO_2$ prior to cryogenic separation of air, or for stopping the nitrogen when the desire is to produce oxygen.

This is why there is generally, at the inlet to adsorbers used for separating air, a layer of an adsorbent designed to remove water, which layer is followed by one or more layers of one or more adsorbents intended more specifically to stop the gaseous component that is to be eliminated, for example the $CO_2$, the nitrogen or other gaseous components, according to the particular case, as explained hereinabove. Conventionally, the layer of adsorbent designed to eliminate the water is, for example, a layer of activated alumina, possibly doped, or silica gel, or even a zeolite which has a high affinity for water and can be regenerated under the normal operating conditions of the unit.

It is also known practice for periodic regeneration to be performed by raising the temperature and also for so-called exceptional regeneration operations to be performed at a temperature higher than the nominal regeneration temperature so as to eliminate traces of moisture which are likely to build up in the adsorbent, that is to say in the zeolite, over time, and in spite of the periodic regeneration phases.

In general, these regeneration operations are performed at a lower regeneration rate, thus making use of the installed power of the heater to obtain a higher outlet temperature, for example 250° C. instead of 150° C. in normal operation, and, after sweeping the bed of adsorbent, to achieve a very low residual moisture content allowing optimum use of the zeolite.

In the same field, document FR-A-9409162 discloses an anti-pollution device that makes it possible to avoid any ingress of moisture into zeolites during the phases in which the adsorption units are not in operation.

To do this, during stoppages, each adsorber is isolated and its inlet is placed in free communication with the atmosphere.

Furthermore, each adsorber, which is under vacuum during each stoppage, is brought back up to atmospheric pressure by introducing a practically dry gas into it, preferably using the production gas.

Thus, all the residual gaseous exchanges with the atmosphere, which are due to the temperature variations of the adsorbents, for example, are across the bed used to dry the gas that is to be treated, and therefore without damage to the zeolite located downstream.

The industrial application of the abovedescribed devices, installations and methods has thus made it possible to achieve performance which is practically unchanged over periods of several years, particularly with a view to producing oxygen by adsorption, or ones in which, in extreme cases, the drop in performance was only a few percent, that is to say was industrially acceptable.

Nonetheless, it has been found that on new-generation units, ageing seems to be accelerated and that an appreciable performance drop-off is observed, right from the first few years of operation.

Given the negative economic consequences associated with this degradation, far-reaching studies have been conducted into this new phenomenon in order to determine its cause.

Thus, from statistical readings taken from samples of adsorbents in industrial units, it has been found that the drop in performance was attributable to the presence of traces of water in the zeolite, admittedly in limited quantity, but nonetheless in higher quantity than the quantity measured when these units were started up.

Unlike older industrial units which may have experienced such problems prior to the application of the teachings of document FR-A-9409162, moisture contamination did not affect a zone of zeolite close to the outlet of each adsorber, i.e. the production side in a very pronounced and fairly appreciable way, but affected the entire mass of adsorbent.

Thus, for example, prior to the implementation of the device described in document FR-A-9409162, a case of contamination could be identified and attributed to the phase of countercurrent repressurization of an adsorber, shut down systematically under vacuum, via a leaky valve on the production side, with water-laden oxygen through a compression machine of the wet type. An analysis of the molecular sieve used in this production unit demonstrated massive contamination of the upper layer of the sieve, on the production side, with moisture, the source of which was, without a doubt, the water contained in the liquid ring pump located in close proximity to and downstream of the production unit.

In the case of the problems encountered with more recent industrial units, the contamination is in fact slow and gradual, that is to say not sudden or in discrete increments.

Tests and measurements performed on industrial units have made it possible to discover the cause of this phenomenon and to understand why it did not occur previously on older industrial units.

This will now be explained taking the example of a unit of the PSA type for the production of oxygen from air, comprising two adsorbers, but the phenomenon is a general one and affects all cases of vacuum regeneration. Likewise, the cycle considered by way of example corresponds to the one described in document U.S. Pat. No. 5,223,004, although this choice is not in any way restrictive.

Document U.S. Pat. No. 5,223,004 is therefore incorporated herein by reference, particularly FIGS. 1 and 2 of that document, together with the passages relating thereto, namely: column 3, lines 20 to 68 and column 4, lines 1 to 24.

From reading that document it is understood that:
the lines on the production gas side are regularly and cyclically placed under vacuum;
there are a number of stages during which oxygen returns, in countercurrent flow, to the adsorbers during the initial pressurization stage, during the stage of pumping the oxygen contained in particular in the lines, and during the elution stage;
this type of cycle requires, on the production outlet side of each adsorber, a certain number of valves which, in succession, isolate the various items of equipment of the PSA unit or place them in fluid communication.

The valves used are of the on/off type, like those depicted in FIG. 2 of the document U.S. Pat. No. 5,223,004 or, as the case may be, of the type whose opening and/or closure is/are controlled, particularly with ramps.

In general, use is made of valves of the butterfly valve type which lead to small variations in pressure when the valves are of the order of 100% open and allow the energy consumption of the installation to be minimized.

In particular, valves of the butterfly valve type have been perfectly suited to the operating conditions of PSA units, that is to say that the high number of operations, the high rate of opening/closure, the required sealing, the characteristics of the method to be implemented, etc have been taken into consideration.

Amongst the changes brought about by this adaptation, mention may be made of the wide choice of materials available for the seat, the bearings, the seals (metal, elastomer, plastomer, filled PTFE, etc), the improvement of the drive lines and passage cross sections, etc. By way of example, the torque needed to open and/or to close the shutter element of a valve of the butterfly type may be restricted by using a double eccentric drive line. In this case, the axis of rotation is offset from the plane of the shut-off element and is off-centre from the axis of the pipework. This design greatly reduces friction between seat and shut-off element sealing surface. Likewise, the shaft rotating the shut-off element may be made in two parts, thus leaving the central zone free for the circulation of the fluid, which has the effect of reducing the pressure drops across the valve.

In general, sealing against the exterior medium at the point where the rotation shaft passes through is of varying type and employs various techniques (packing, O-ring, V-ring, double seal, etc) and known materials.

On certain types of valve, the bearings are easily replaceable including the bearing opposite the operating spindle which may, for example, constitute a cartridge that can readily be removed without having to open or remove the actual valve.

In spite of all these adaptations, it has become evident, during tests performed on industrial units, that the problems in performance drop-off over time found on the most recent PSA units lay with the sealing against the external surroundings, that is to say against the ambient atmosphere.

In fact, the premature ageing of the adsorbent, particularly of the particles of zeolite, can be explained by the current evolution of PSA units, particularly air-separation PSA units.

Specifically, recent PSA units have been characterized by a use of a molecular sieve, that is to say an adsorbent, of increasingly high performance, and by the reduction in the cycle times.

Returning to the example of the separation of air to produce oxygen, there has been an evolution from PSA units using adsorbents of the zeolite 13X or 5A type, operating with cycle times of a few minutes, towards PSA units using adsorbents of the zeolite X or LSX type exchanged with metal, such as lithium, cations, and operating with cycle times of the order of a few tens of seconds, typically under 90 seconds.

The intrinsic increase in productivity of the adsorbent material, coupled with the reduction in cycle time means that between 5 and 10 times less zeolite is currently used than was used in a conventional unit, such as a unit employing adsorbents of the zeolite 13X or 5A type, this being for the same production.

It will also be noted that it is this substantial reduction in the amount of adsorbent needed that has made it possible to reduce the investment cost because the more elaborate new materials may be between about 3 to 6 times more expensive than the more conventional materials such as zeolite 13X or 5A.

Moreover, for a given rate of production, the other equipment items have changed relatively little in size, particularly the lines of pipework on the production outlet side of the adsorbers; the flow rates circulating still being of the same order of magnitude.

From this, returning again to the aforementioned example of the MPSA cycle, it will be understood that although the quantities of gas exchanged during each stage are lower because of the reduction in the volume of adsorbent, the flow rates are themselves practically unchanged because of the reduction in the duration of these very stages. For the same pressure drop and for a given rate of production, it is therefore normal for the diameter of the pipework to be unchanged.

In practice, as the intrinsic performance of the units have improved as the sieve has evolved, so the energy drops which are due to the pressure drops in the system have proportionately adopted greater significance than before, and the tendency has been rather to reduce them, that is to say to increase the diameter of some of the pipework.

In general, it may be remembered that the evolution of PSA units had led to the installation of increasingly small amounts of adsorbent, while keeping connecting circuits the dimensions of which are unchanged.

Furthermore, it follows from the above that the number of valve operations has only increased during this evolution, in a manner which, to a first approximation, is inversely proportional to the length of the cycle.

For the same valves, seal ageing is therefore markedly more rapid in recent units.

The ingress of wet atmospheric air into the method circuits under vacuum, through these seals, that can be seen after about two or three months of service, now correspond, for technology which in other respects is the same, to the ingress that was previously obtained after one or two years.

Because of the gaseous exchanges between adsorbers, most of this moisture will preferably become trapped and accumulate on the adsorbent, particularly the zeolite, instead of being carried along and removed by the production stream.

Now, the regeneration power employed in any PSA unit, which is needed to make the unit operate cyclically, tends to spread this moisture, from the zeolite zone located at the outlet of the adsorber, throughout the entire mass of the adsorbent, thus gradually leading to contamination that affects the entire mass of adsorbent.

In other words, recent PSA units experience an accumulation of a significant amount of moisture on the sieve they contain in their adsorbers, because of the unchanged size of the valves and their premature ageing as a result of the increase in the number of operations, this accumulation being all the more harmful if the volume of adsorbent used is low, as is the case with recent units.

As the effect of traces of moisture is at least as significant for new adsorbents, such as zeolites Li-X or Li-LSX as it is for more conventional adsorbents such as zeolites 13X or 5A, it will be appreciated that the drop in performance for one and the same period of operation, six months or a year for example, may on average be one order of magnitude higher for recent current units with a short cycle and using a high-performance zeolite-type adsorbent than it is for conventional units, and may therefore begin to be experienced just a few months after entry into service whereas before, this phenomenon used to pass unnoticed.

An obvious first solution for solving this problem of valve sealing and the harmful ingress of moisture consists in using adequate valves, that is to say valves which are completely sealed against the outside.

A number of types of valve meeting these criteria have been developed for various applications and mention may, for example, be made of valves equipped with bellows seals.

However, these "leakproof" valves are generally of high cost, and less readily available commercially than conventional valves, are often ill-suited or unsuited to the short cycle times of the PSA units and complicated to remove for maintenance purposes because of their complex sealing system.

In addition, to replace all the "non-leakproof" valves with "leakproof" valves on an industrial PSA unit already in operation and in respect of which the aforementioned problem of the loss of adsorbent performance arises is not conceivable because such replacement would be complicated to carry out and very expensive, especially as it would necessitate a complete shut-down of the PSA unit and therefore of the production of gas throughout the duration of the intervention aimed at carrying out this replacement, thereby giving rise to significant drops in productivity for several days or several weeks, or even several months.

Furthermore, in-situ regeneration of the contaminated sieve is theoretically possible but the costs involved in such regeneration are such that this solution is generally not adopted except in special circumstances.

This is because to regenerate a zeolite of this type it has to be swept for several hours with an essentially dry gas at a high temperature, of the order of 250 to 350° C.

Moreover, with certain particular adsorbents, such as zeolites for example, it may also be necessary in addition to conform to temperature increase rates and intermediate temperature soaks in order to avoid degrading the zeolitic phase.

This all assumes that the equipment items are mechanically suited to such high temperatures when they normally run at or around ambient temperature (less than 50° C.), which in itself gives rise to not insignificant increases in cost of the materials, etc.

The need to install a heater, to have a dry gas, etc, means that in practice, a charge of water-contaminated zeolite is generally removed from the production unit in which it is situated, and replaced with a new charge of zeolite, which works out particularly expensive for the most high-performance zeolites, for example the metal cation exchanged zeolites.

These various solutions are therefore all very expensive or even, in the case of some of them, unrealistic, on an industrial scale.

SUMMARY OF THE INVENTION

From there, the present invention sets out to solve the problem of the deactivation and progressive deterioration of the adsorbent by the accumulation thereon of atmospheric moisture, that is to say water, as the result of the ingress of moisture because of the lack of sealing of the operating valves arranged on the pipework of the PSA unit in which the adsorbent is installed.

In other words, the present invention intends to improve installations and methods for treating gas by adsorption, particularly for purifying or separating air by adsorption, so as to avoid any contamination of a slow and gradual accumulation on the adsorbent with atmospheric water vapour whose ingress into the gas separation unit is made possible through the lack of sealing of the operating valves.

The solution afforded by the present invention is particularly advantageous from the industrial standpoint because it not only makes it possible to solve the above problem, that is to say to eliminate or minimize the premature ageing of the adsorbents, particularly the particles of zeolite, so as to maintain high gas separation unit performance, particularly air separation PSA unit performance, but also makes it possible to continue to use conventional valves, such as the aforementioned valves of the butterfly type, even though these do not seal perfectly.

The present invention relates to a gas treatment installation comprising:
- at least one gas treatment vessel containing at least one adsorbent, the vessel having at least one orifice,
- at least one gas pipe communicating with the orifice,
- at least one valve arranged on the gas pipe and controlling the flow of the gas flowing through the pipe, the valve comprising means of operating the valve and sealing means,
- characterized in that means of maintaining a protective gaseous atmosphere are arranged around at least part of the means of sealing the valve to make it possible to create and/or to maintain a protective gaseous atmosphere around at least part of the means of sealing the valve.

As the case may be, the installation of the invention may comprise one or more of the following features:
- said means of maintaining a protective gaseous atmosphere comprise a chamber forming a sleeve around at least part of the means of sealing the valve,
- the chamber encompasses at least part of the means of sealing and at least part of the means of operating the valve,
- the wall of the chamber forming a sleeve is pierced with at least one orifice communicating with at least one protective-gas supply line connected to at least one source of protective gas so as to allow the inside of the chamber to be supplied with at least some of the protective gas that originates from the source of protective gas,
- the source of protective gas is a gas treatment vessel,
- the chamber forming the sleeve is made up of a box formed of several walls joined together; the box is preferably formed from at least one peripheral wall, a bottom and a lid (or roof). As the case may be, the peripheral wall may consist of a single wall, such as a cylindrical wall or the like, or be made up of a number of walls fixed together, for example four walls arranged in a square, a rectangle or the like,
- it is chosen from installations of the PSA or TSA, that is to say temperature swing adsorption, type, the operation of which employs at least one stage of regeneration under vacuum, that is to say at a pressure below atmospheric pressure (<$10^5$ Pa), for example, a PSA or TSA installation comprising from 1 to 3 adsorbers, preferably radial geometry adsorbers, that is to say adsorbers in which fluid flows radially either centrifugally or centripetally, the adsorbers operating alternately.

The invention also relates to a method for avoiding and/or minimizing the contamination of an adsorbent by at least one impurity present in the ambient air contained in at least one gas treatment vessel of a gas treatment installation, comprising:
- at least the gas treatment vessel containing at least the adsorbent, the vessel having at least one orifice,
- at least one gas pipe communicating with the orifice,
- at least one valve arranged on the gas pipe and controlling the flow of the gas flowing through the pipe, the valve comprising means of operating the valve and sealing means,
- in which means of maintaining a protective gaseous atmosphere are arranged around at least some of the means of sealing the valve so as to make it possible to create and/or to maintain a protective gaseous atmosphere around at least part of the means of sealing the valve.

As the case may be, the method of the invention may comprise one or more of the following features:
- the protective gaseous atmosphere is created and maintained by sweeping at least part of the means of sealing the valve with gas using a protective gas which is substantially free of the impurity,
- the means of maintaining a protective gaseous atmosphere comprise at least one chamber forming a sleeve around at least part of the means of sealing the valve, the chamber forming a sleeve containing a protective gas substantially free of the impurity, and the protective gas is preferably introduced into the chamber forming the sleeve via at least one protective-gas inlet orifice arranged in at least one wall of the chamber,
- the pressure of the protective gas introduced into the chamber is higher than the local atmospheric pressure or, more generally, is higher than the pressure outside the valve if the valve is, for example, somewhere where the pressure is raised with respect to local atmospheric pressure. This raised pressure may be restricted to a few millibar or a few tens of millibar, preferably between 10 mbar and 100 mbar, the impurity is chosen from water vapour and carbon dioxide, preferably water vapour, the protective gas is chosen from dry air, nitrogen, oxygen or a mixture of nitrogen and oxygen essentially free of moisture or containing an insignificant amount of water vapour, that is to say an amount which is so infinitesimally small that it has little or no influence on the zeolite, the installation is of the PSA type, particularly of the VSA type, comprising means of regeneration under at least a partial vacuum and producing oxygen or nitrogen from air, or producing air which has been rid of its main atmospheric contaminants (water, $CO_2$, etc), the protective gas contains or consists of a proportion of oxygen, nitrogen, a nitrogen/oxygen mixture or air rid of its main atmospheric contaminants produced by or tapped from the PSA or VSA installation comprising means of regeneration under at least partial vacuum. In a known way, in the case of a PSA or VSA method, the high adsorption pressure is between 1 bar and 100 bar, preferably of the order of 1 to 30 bar, the low desorption pressure, that is to say the regeneration pressure, is between 0.1 bar and about 1 bar, the supply temperature is between −50° C. and +200° C., the supply temperature is between 10° C. and 80° C., preferably between 25° C. and 60° C., the gas that is to be treated is a gaseous mixture essentially containing nitrogen and oxygen, particularly air; a gaseous mixture essentially containing hydrogen and/or carbon monoxide; a gaseous mixture essentially containing one or more hydrocarbons, particularly olefins; or a gaseous mixture containing carbon dioxide, the adsorbent contains particles chosen from zeolites and aluminas, the fluid to be treated is a gaseous mixture essentially containing nitrogen and oxygen, the adsorbent is a zeolite, preferably chosen from faujasites or zeolite As, advantageously a zeolite X with an Si/Al ratio of approximately 1 to 1.25, such a zeolite is known as a zeolite X or LSX (Low Silica X) or silica-poor zeolite. A zeolite X such as this Ray contain at least 80% of $Li^+$ cations, preferably at least 86%, and/or at most 96% of $Li^+$ cations and/or at mast 15% of $Na^+$ cations, preferably at most 14%, mare preferably still, at most 12%, and/or at least 4% of $Na^+$ cations and/or at most 5% of $Mg^{2+}$ cations, preferably at most 2%, and/or at least 0.1% of $Mg^{2+}$ cations, preferably at least 0.2%, and/or at most 8% of $Ca^{2+}$ cations, preferably at most 5%, and/or at least 0.2% of $Ca^{2+}$ cations, Preferably at least 1%, and/or at most 3% of $K^+$ cations, preferably at most 1%, preferentially at most 0.5%.

BRIEF DESCRIPTION OF THE DRAWINGS

The invention will now be described in greater detail with the aid of the appended figures which are given by way of illustrative but non-limiting illustration.

Figure 1:
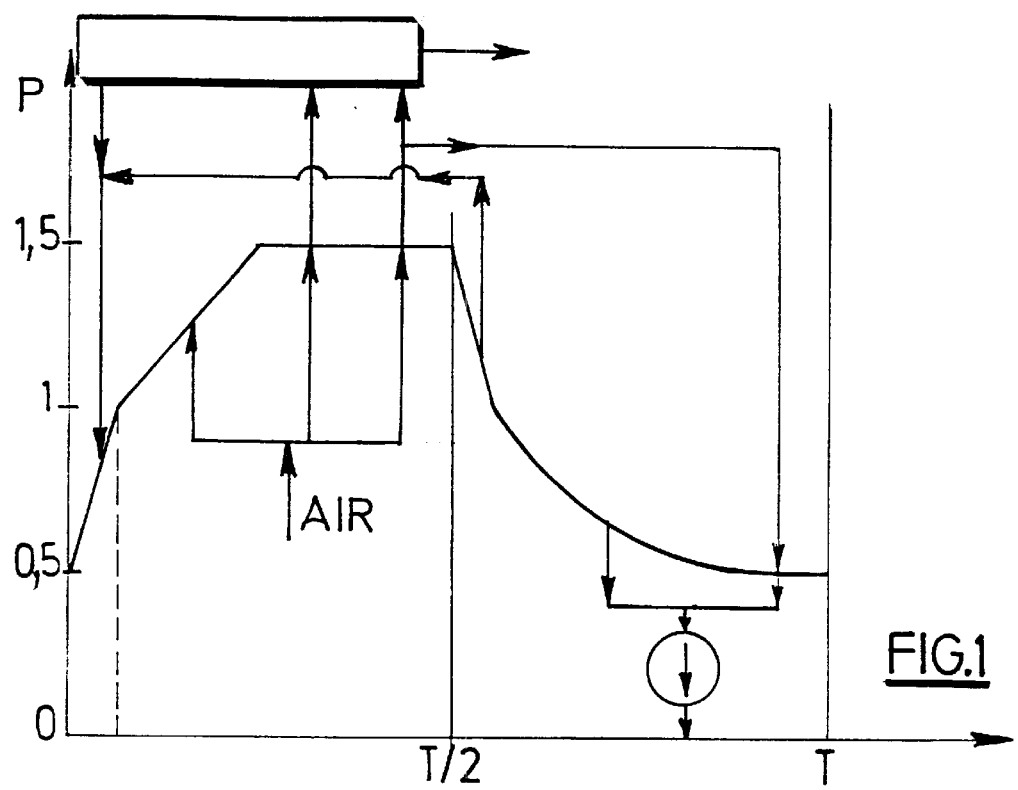
FIG. 1 depicts an operating cycle of a gas treatment installation in accordance with the teachings of U.S. Pat. No. 5,223,004 incorporated herein by reference.

A PSA installation such as this comprises two gas treatment vessels commonly known as adsorbers, 1, 2, each containing an adsorbent, for example particles of zeolite X exchanged to an extent in excess of 85%, with lithium cations; the adsorbent could be arranged in a single bed or, as the case may be, distributed in a number of beds containing the adsorbent or a number of layers containing adsorbents of different natures or having different properties, as described, for example, in document U.S. Pat. No. 5,922,107.

Each adsorber 1, 2 has at least one gas in et orifice 3, 4 allowing gas that is to be treated, in this instance compressed air, to be introduced into she adsorber 1, 2, and at least one gas outlet orifice 5, 6, respectively, allowing the gas produced or treated, in this case oxygen, or an oxygen-rich mixture, that is to say one containing at least 85% oxygen, to be discharged from the adsorber 1, 2.

Atmospheric air is drawn in (at 11) through the inlet of a compressor 12, is compressed by this compressor 12 to a pressure higher than 1 bar, for example about 1.5 bar, before being conveyed, via one or more gas pipes 20, to one or other of the adsorbers 1 or 2 into which it is introduced via the gas inlet orifice 3 or 4 respectively.

Furthermore, another pipe 15 is connected to the pipe 20, the other pipe 15 being used during the adsorber 1, 2 countercurrent purge and desorption stages.

The pipe 15 comprises a vacuum pump 16 used to draw off gas present in the adsorbers so as to bring the adsorbers down to the low pressure of the cycle, for example 0.35 bar.

Figure 2:
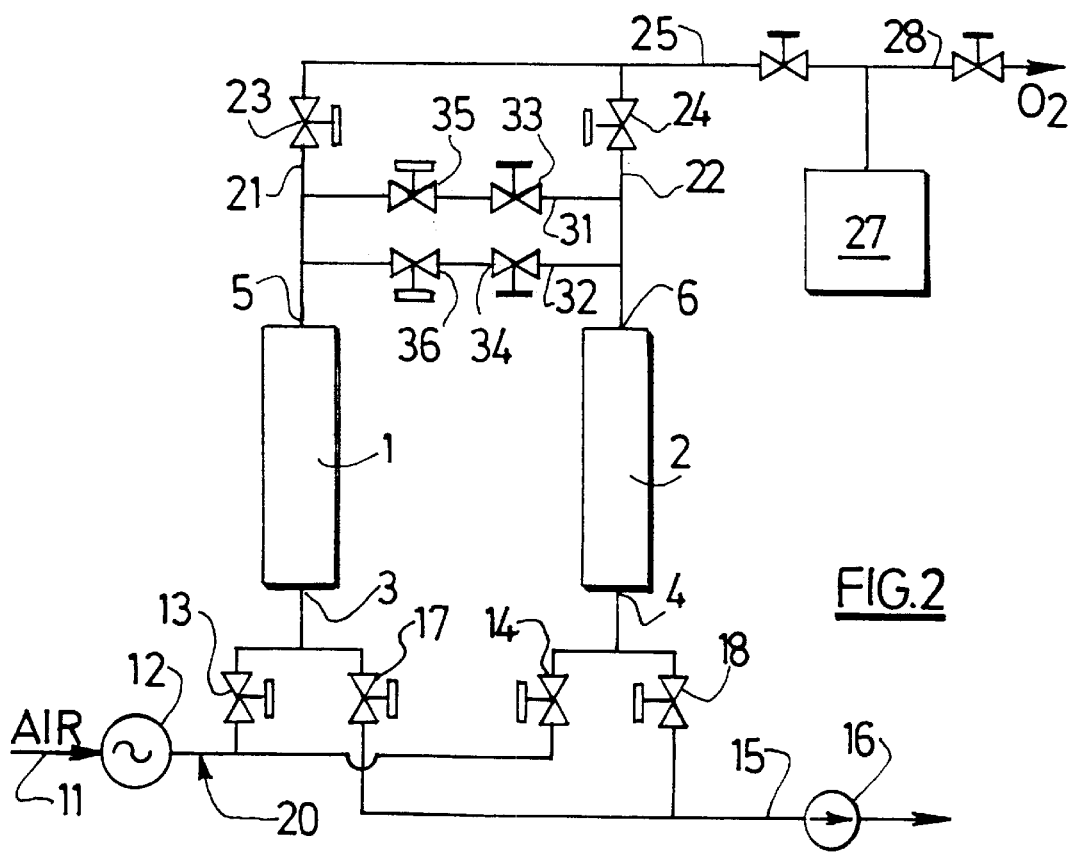
FIG. 2 represents a diagram of a conventional gas treatment installation in accordance with the teachings of document U.S. Pat. No. 5,223,004 incorporated herein by reference and, more specifically, of an installation for separating air by using a method of the PSA type, the operating cycle of which is depicted diagrammatically in FIG. 1 and also explained in document U.S. Pat. No. 5,223,004 incorporated herein by reference.

As can be seen in FIG. 2, a number of valves 13, 17, 14, 18 are arranged on the gas pipes 20 and 15, and control the flow of gas therethrough.

On the production side, the pipes 21 and 22 feed, via the valves 23 and 24, the production pipe 25 then the buffer volume 27 and the line 28 which sends the production gas to the user site.

The lines 31 (with the valves 33 and 35) and 32 (with the valves 34 and 36) serve, respectively, are used for the stages of balancing between adsorbers and of elution.

It will be noted that, as an alternatives the valves 35 and/or 36 can be fitted with a device for regulating their opening thus in this instance, making the presence of the valves 33 and 34 unnecessary.

Considering FIG. 2, the invention will preferably be applied to valves 23, 24, 33 to 36, generally of the butterfly valve type, located on circuits connected to the production side of the adsorbers.

All these valves 23, 24, 33 to 36 experience, during the production cycle, pressures which are below atmospheric pressure, that is to say which are under vacuum, and it is therefore via these valves 23, 24, 33 to 36 that, during the phases under vacuum, most of the moisture or other atmospheric contaminants can enter the pipe circuit of the PSA unit and thus subsequently go and contaminate the adsorbent, that is to say the zeolite contained in the adsorbers 1, 2.

Figure 3A:
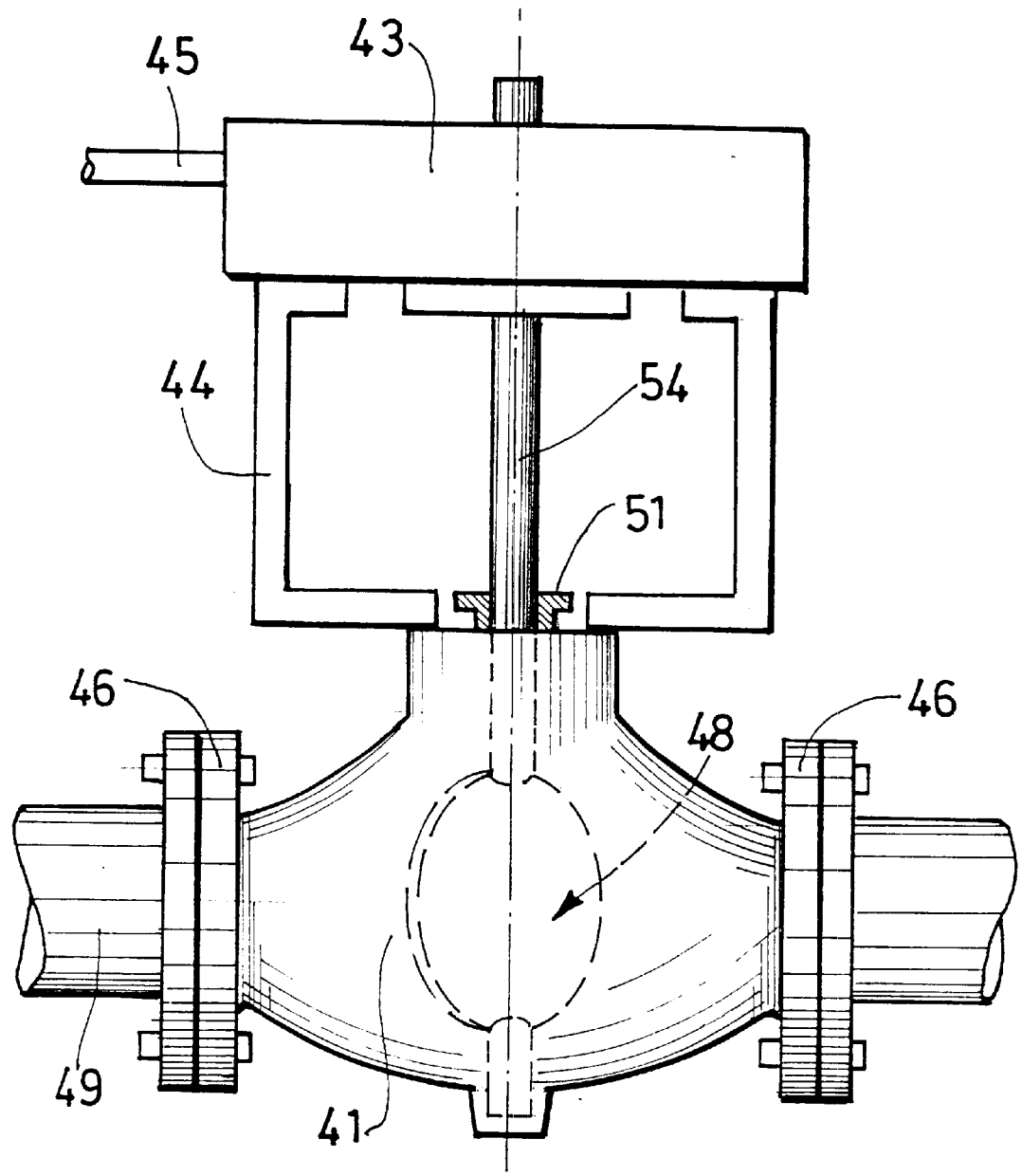
FIG. 3A depicts an operating diagram for valves 23, 24, 33 to 36 in FIG. 2.
Figure 3B:
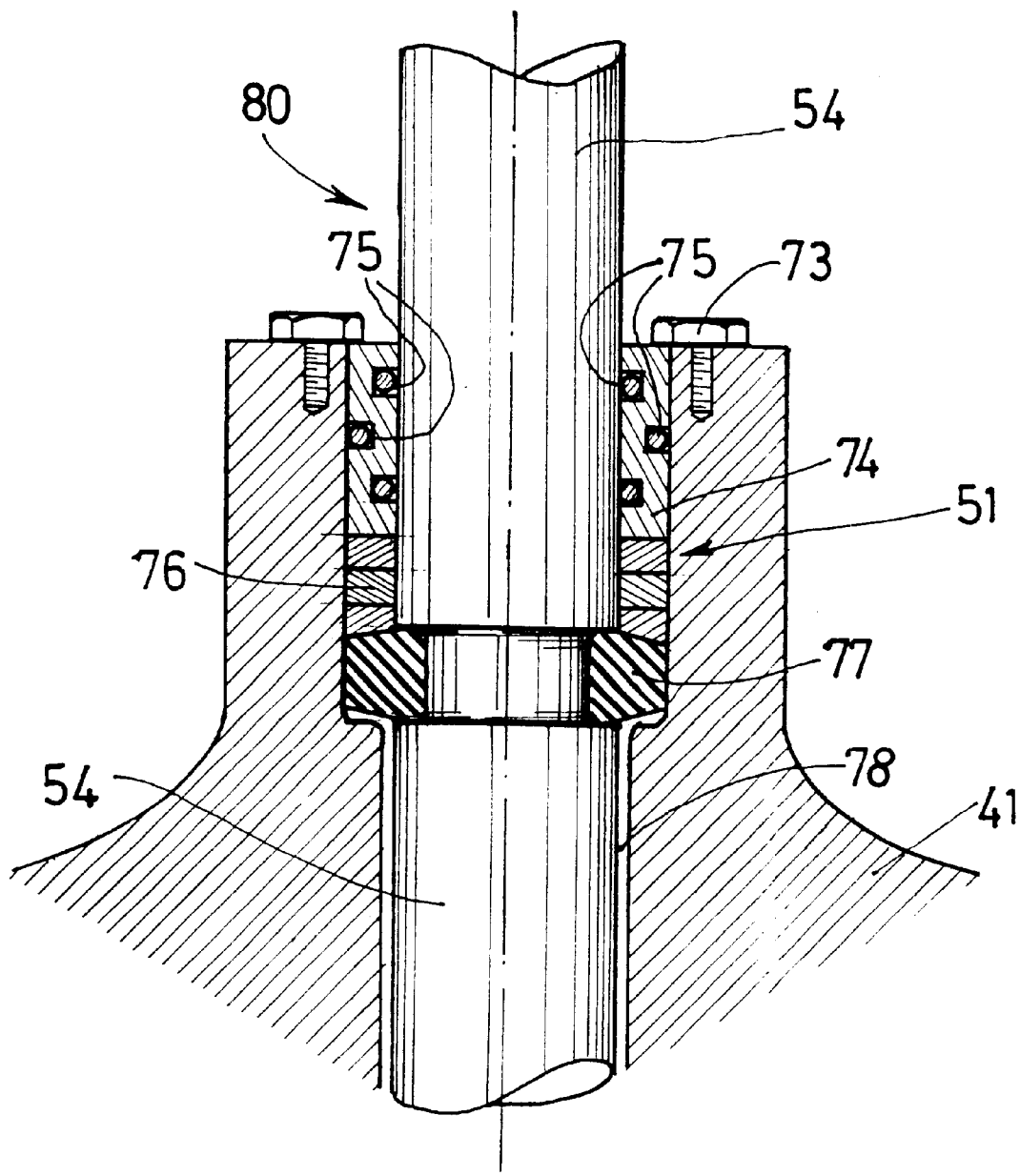
FIG. 3B depicts one embodiment of a conventional seal for the valves 23, 24, 33 to 36 in FIG. 2.

FIG. 3a depicts an operating diagram for these valves 23, 24, 33 to 36 and one embodiment of a seal of a conventional type is depicted in FIG. 3b, that is to say that FIG. 3b diagrammatically depicts the way in which the valves 23, 24, 33 to 36 are conventionally sealed.

Although numerous alternative forms of valve exist, given their architectural diversity, each valve, as shown in a simplified and substantially generalized way in FIG. 3a, conventionally comprises a valve body 41 surmounted by a part 44 forming a yoke and also comprising an actuator 43, an operating shaft 54, a system 51 for sealing the shaft 54 and connection flanges 46 to take the ends of two pipes 49.

More specifically, the actuator 43 of a valve makes it possible to move the shut-off member 48 via the operating shaft 54, so as to open or close the valve, that is to say allow or prevent any passage of fluid.

The actuator 43 surmounting the yoke-forming part 44 is actuated pneumatically using instrument air conveyed to the valve by an instrument air supply pipe 45.

Sealing between the PSA installation pipe circuit and the external surroundings is via the system 51 for sealing the shaft 54.

In a conventional way, such a sealing system 51 needs to limit the possibility of fluidic communication between the PSA installation pipe circuit and the external surroundings 80, while at the same time allowing easy manoeuvring of the shaft 54, that is to say, in this instance, allowing it to rotate easily about its axis.

Hence, as detailed in FIG. 3b, it is common for such a sealing system 51 to be made up of a series of packings 76 borne by a thrust bearing 77 and a O-ring seals 75 placed in a seal carrier 74, all this being partially fixed to the valve body 41 and compressed by clamping screws 73 or the like, so as to restrict exchanges between, on the one hand, the process fluid present in the clearance or space 78 there is between the valve body 41 and the operating shaft 54 and, on the other hand, the ambient external surroundings 80.

In accordance with the present invention, with a view to creating and maintaining a protective gaseous atmosphere around at least some of the means 51 of sealing at least one of the valves 23, 24 and 33 to 36, means 52 for maintaining a protective gaseous atmosphere are arranged around the means 51 of sealing at least one of the valves 13, 17, 14, 18.

By way of example, consideration will be given to valve 35.

Figure 4:
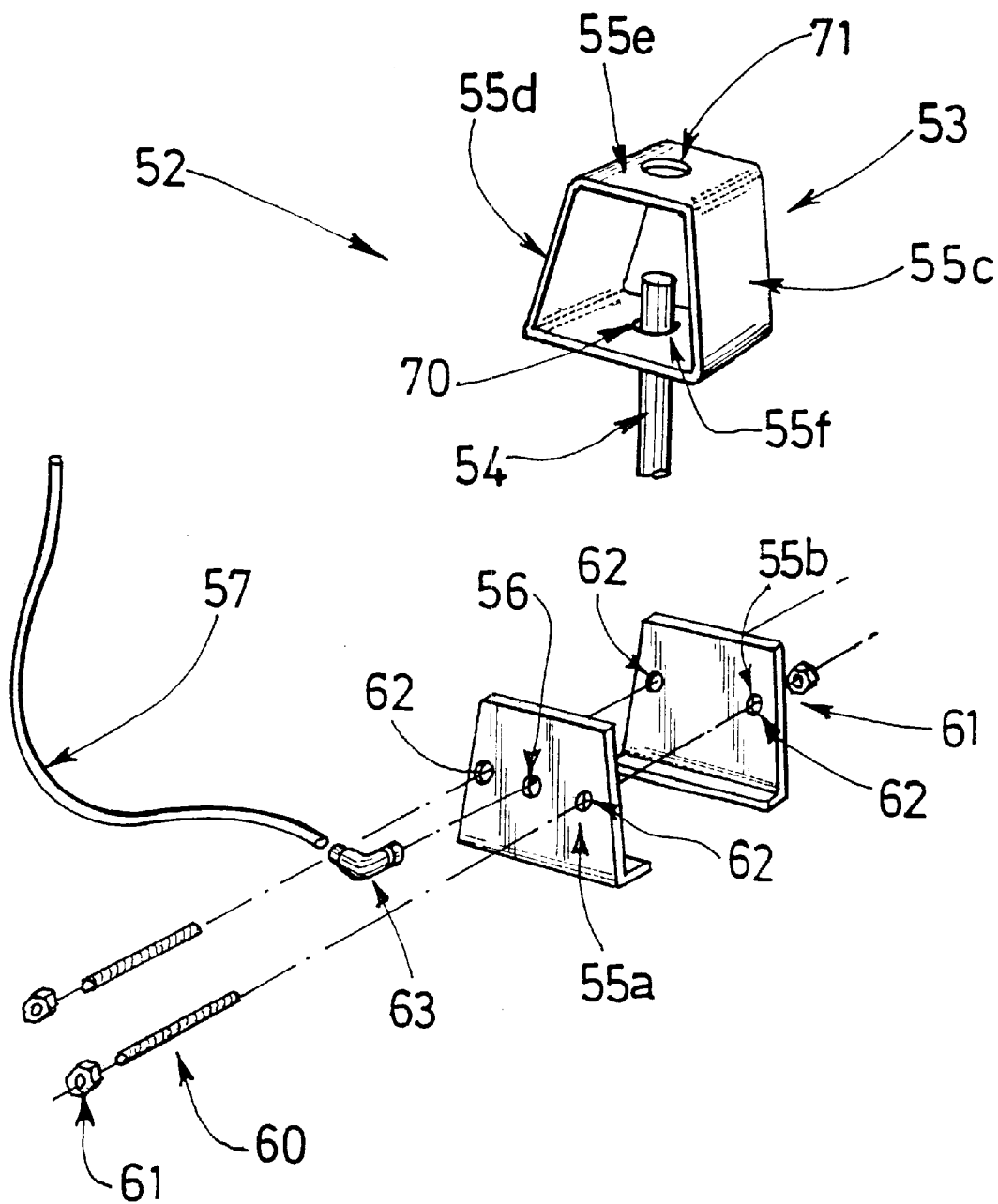
FIG. 4 depicts a means for maintaining a protective gaseous atmosphere.

As depicted diagrammatically in FIG. 4, the means 52 of maintaining a protective gaseous atmosphere comprise a chamber 53 forming a sleeve around the means 51 of sealing the valve 35, possibly encompassing at least some of the means 50 of operating the valve 35, particularly part of the operating shaft 54 and the outer part of the system 51 used for sealing the shaft 54.

In this case, the chamber 53 is formed of four peripheral side walls 55a, 55b, 55c, 55d, of a wall 55e forming a roof or lid, and of a wall 55f forming a bottom.

In this instance, the peripheral side walls 55c, 55d, the lid 55e and the bottom 55f are joined together and form a hollow single three-dimensional structure, whereas the side walls 55a, 55b are fixed to this hollow three-dimensional structure by appropriate fixing means, for example using threaded rods 60 and bolts 61, orifices 62 pierced in the side walls 55a, 55b allowing the threaded rods 60 to pass through the hollow three-dimensional structure.

The side wall 55a of the chamber 53 is pierced with a gas passage orifice 56 communicating with a protective gas supply line 57 connected to a source (not depicted) of protective gas to allow the inside of the chamber 53 to be supplied with protective gas from the source of protective gas, such as a storage volume, a unit for producing "instrument" air or one of the adsorbers 1, 2.

The protective gas supply line 57 is fixed to the side wall 55a of the chamber 53 by a hollow elbowed piece 63.

As can be appreciated from FIG. 4, the lid 55e and the bottom 55f of the hollow three-dimensional structure have holes 71, 70, respectively, through which the operating shaft 54 passes.

According to the present invention, a protective gaseous atmosphere is maintained around the means 51 of sealing the valve 35, to make it possible to create and/or maintain a gaseous atmosphere to protect the sealing means 51, preferably by sweeping the sealing means 51 with gas using the protective gas introduced into the chamber 53 through the orifice 56.

It goes without saying that, as protective gas, use is made of a gas or a gaseous mixture which is substantially free of the harmful impurity or impurities, for example of a gas or gaseous mixture free of water vapour, for example dry air or dried oxygen, when the impurity to be combated is water vapour.

However, use is advantageously made of dry and de-oiled "instrument" air available on the site on which the PSA unit is installed as the protective gas because it is particularly simple to do and is economical.

In the known way, the term "instrument" air is given to compressed air under a pressure, for example, of the order of 8 bar, which has been filtered, has had oil removed and has been dried by appropriate items of equipment and which is used as driving fluid to operate the valves via actuators or for the pneumatic instrumentation.

The pressure of the protective gas introduced into the chamber 53 is preferably higher than atmospheric pressure, the increase in pressure generally being of the order of 10 to 100 mbar above atmospheric pressure.

When the walls 55a and 55b are fixed to the three-dimensional structure, the chamber 53 thus formed is hollow and relatively well sealed, and the atmospheric impurities, particularly water vapour, cannot enter it because of the raised pressure generated by introducing the protective gas into the chamber 53.

As an alternative or in addition, it is possible to use a material that has a high affinity for the impurity whose ingress into the circuit of the PSA installation is to be avoided, for example moisture. Thus, the chamber 53 could be fully or partially filled, for example, with a desiccant of the silica gel or activated alumina type, which could be replaced periodically to prevent it from becoming saturated. The ease of intervention on an industrial unit makes it possible to envisage frequent replacement of this material. In general, the use of such a material could supplement the introduction of protective gas sweeping either by way as a back-up in case the supply of protective gas should be temporarily interrupted, or to reduce the residual amount of impurities liable to be present in the protective gas used.

What is claimed is:

1. A method for avoiding and/or minimizing the contamination of an adsorbent by at least one impurity present in the ambient air contained in at least one gas treatment vessel of a gas treatment installation operating using a treatment cycle, at least part of which cycle is performed at a pressure below atmospheric pressure, the installation comprising:

at least the gas treatment vessel containing at least the adsorbent, the vessel having at least one orifice, at least one gas pipe communicating with the orifice, at least one valve arranged on the gas pipe and controlling the flow of the gas flowing through the pipe, the valve comprising means of operating the valve and sealing means, the method comprising maintaining a protective gaseous atmosphere around at least some of the means of sealing the valve to create and/or to maintain a protective gaseous atmosphere around at least part of the means of sealing the valve.

2. The method according to claim 1, wherein the protective gaseous atmosphere is created and maintained by sweeping at least part of the means of sealing the valve with gas using a protective gas which is substantially free of the impurity.

3. The method according to claim 2, wherein at least one chamber forming a sleeve is arranged around at least part of the means of sealing the valve, the chamber forming a sleeve containing the protective gas substantially free of the impurity.

4. The method according to claim 3, wherein the pressure of the protective gas introduced into the chamber is higher than the ambient atmospheric pressure.

5. The method according to claim 4, wherein the pressure of the protective gas is between 10 mbar and 100 mbar higher than the ambient atmospheric pressure.

6. The method according to claim 3, wherein the protective gas is introduced into the chamber forming the sleeve via at least one protective-gas inlet orifice formed in at least one wall of the chamber.

7. The method according to claim 1, wherein the impurity is chosen from water vapour and $CO_2$, and/or the protective gas is chosen from dry air, nitrogen, oxygen or a mixture of nitrogen and oxygen.

8. The method according to claim 1, wherein the installation is a PSA installation.

9. The method according to claim 8, wherein the installation is a VSA installation producing oxygen from air and the protective gas contains or consists of some of an instrument air used to actuate at least one valve.

10. An installation for treating gas working on a treatment cycle, in which at least part of the cycle is performed at a pressure below atmospheric pressure, comprising:

at least one gas treatment vessel containing at least one adsorbent, the vessel having at least one orifice;

at least one gas pipe communicating with the orifice;

at least one valve arranged on the gas pipe and controlling the flow of the gas flowing through the pipe, the valve comprising means of operating the valve and sealing means; and means of maintaining a protective gaseous atmosphere arranged around at least part of the means of sealing the valve to create and/or to maintain a protective gaseous atmosphere around at least part of the means of sealing the valve.

11. The installation according to claim 10, wherein the means of maintaining a protective gaseous atmosphere comprise a chamber forming a sleeve around at least part of the means of sealing the valve.

12. The installation according to claim 11, wherein the chamber encompasses at least part of the means of sealing and at least part of the means of operating the valve.

13. The installation according to claim 11, wherein the wall of the chamber forming a sleeve is pierced with at least one orifice communicating with at least one protective-gas supply line connected to at least one source of protective gas so as to allow the inside of the chamber to be supplied with at least some of the protective gas that originates from the source of protective gas.

14. The installation according to claim 13, wherein the source of protective gas is a gas treatment vessel, a storage tank or a unit for producing instrument air.

15. The installation according to claim 11, wherein the chamber forming the sleeve is made up of a box formed of a number of walls joined together.

16. The installation according to claim 15, wherein the number of walls joined together comprise at least one peripheral wall, a bottom and a lid.

17. The installation according to claim 15, wherein at least some of the walls form part of the valve and at least some of the walls are additional walls.

18. The installation according to claim 10, wherein the installation is a PSA or a TSA installation.

* * * * *